(12) United States Patent
Dwyer et al.

(10) Patent No.: US 6,701,081 B1
(45) Date of Patent: Mar. 2, 2004

(54) DUAL CAMERA MOUNT FOR STEREO IMAGING

(75) Inventors: Patrick H. Dwyer, Penn Valley, CA (US); Gordon R. Southam, Grass Valley, CA (US)

(73) Assignee: Air Controls, Inc., Penn Valley, CA (US)

( * ) Notice: Subject to any disclaimer, the term of this patent is extended or adjusted under 35 U.S.C. 154(b) by 40 days.

(21) Appl. No.: 09/589,223

(22) Filed: Jun. 6, 2000

(51) Int. Cl.[7] .......................... G03B 35/00; G03B 41/00
(52) U.S. Cl. ....................... 396/329; 396/333
(58) Field of Search ............... 396/329, 428, 396/325, 324, 323, 334

(56) References Cited

U.S. PATENT DOCUMENTS

| | | | | |
|---|---|---|---|---|
| 2,583,030 A | * | 1/1952 | Waller et al. ............... | 396/334 |
| 2,630,737 A | * | 3/1953 | Ramsdell .................... | 396/325 |
| 2,782,700 A | * | 2/1957 | Ianuzzi ........................ | 396/329 |
| 2,891,441 A | * | 6/1959 | Spottiswoode et al. ..... | 396/325 |
| 4,418,993 A | * | 12/1983 | Lipton .......................... | 352/57 |
| 4,768,049 A | * | 8/1988 | Barrett et al. ............... | 396/329 |
| 4,996,547 A | * | 2/1991 | McKeown et al. ......... | 396/329 |
| 5,752,113 A | * | 5/1998 | Borden ........................ | 396/428 |
| 5,778,268 A | * | 7/1998 | Inaba .......................... | 396/326 |
| 5,949,477 A | * | 9/1999 | Hoglin ........................ | 396/325 |

* cited by examiner

Primary Examiner—Christopher Mahoney

(57) ABSTRACT

An apparatus and method for holding two cameras on a single mount for stereo graphic imaging with controls for: (a) the synchronous convergence of the optical line of focus of both cameras at a single point at a desired distance; (b) the adjustment of the position of the image focal plane in one camera with respect to the image focal plane in the other camera such that the two cameras are correctly focused on the same image; (c) the adjustment of the spacing between the two cameras such as to mimic the average distance between human eyes; and (d) adjustment of the two cameras such that the two cameras, while being converged, rotate around the same image (nodal) point.

The primary benefits of the present invention are a compact mechanical configuration, simple and precise control of the optical convergence of two cameras, simple and precise alignment of the image plane in one camera with respect to the image plane in the second camera, simple adjustment of the distance between the cameras to mimic the distance between human eyes, and simple adjustment of the image (nodal) point around which the cameras are rotated for convergence.

2 Claims, 6 Drawing Sheets

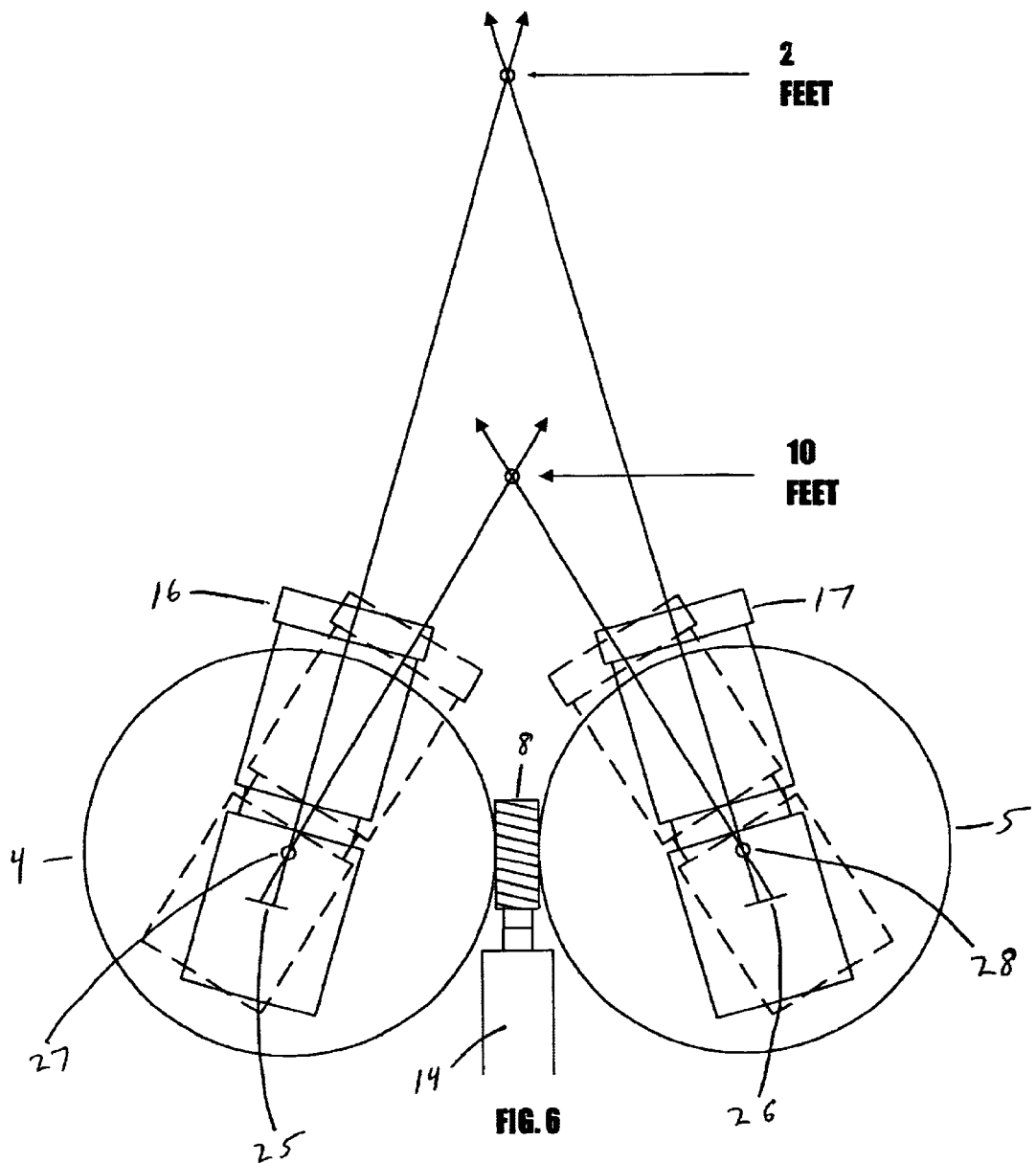

DUAL CAMERA MOUNT FOR STEREO IMAGING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains to a certain apparatus whereby a mount for two cameras for use in stereo imaging has controls for the convergence of the two cameras, adjustment of the position of the image plane in one camera with respect to the image plane in the other camera such that the two cameras are correctly focused on the same image, adjustment of the spacing between the two cameras such as to mimic the average distance between human eyes, and adjustment of the two cameras such that the two cameras, while being converged, rotate around the same image (nodal) point.

The primary benefits of the present invention are a compact mechanical configuration, simple and precise control of the optical convergence of two cameras, simple and precise alignment of the image plane in one camera with respect to the image plane in the second camera, simple adjustment of the distance between the cameras to mimic the distance between human eyes, and simple adjustment of the image (nodal) point around which the cameras are rotated for convergence.

2. Description of the Background Art

A wide variety of camera mounts have been known and used since the beginning of the film and television industries. Almost all of these are designed for a single camera and two dimensional photography. A small number of camera mounts that hold two cameras simultaneously have been made for making three dimensional photographs, motion picture films and television shows, commonly referred to as "stereo graphic" or "3D" imaging. At least one such camera mount known to Applicant has a very coarse, manual adjustment of the convergence of the two camera's optical systems, but it is poorly designed and very difficult to use. To applicant's knowledge, no dual camera mount, of the design disclosed herein, has contained all of the following elements: (a) a convenient and accurate convergence adjustment mechanism; (b) the ability to precision adjust, in any dimension, the position of the image planes between the two cameras such that they were located at the same image focal plane and received the same image; (c) the ability to adjust the spacing between the two cameras such as to mimic the average distance between human eyes; and (d) the ability to adjust the two cameras such that the two cameras, while being converged, rotate around the same image (nodal) point.

BRIEF SUMMARY OF THE INVENTION

The present invention consists of a mount for two cameras that provides a combination of precision convergence control and precision alignment of the image planes of two cameras for stereo graphic imaging. More particularly, it is an apparatus for precise control of the convergent focusing of two cameras and the fine adjustment of the position of the image plane in one camera with respect to the image plane in the other camera. This apparatus significantly improves the ability to make stereo graphic images by making the adjustment of camera convergence and the alignment of the image focal planes precise and simple.

One object of the invention is to combine into a single mount for two cameras a simple and precise control of the optical convergence of the two cameras.

Another object of the invention is to combine into a single mount for two cameras simple and precise alignment of the image focal plane in one camera with respect to the image focal plane in the second camera.

Another object of the invention is to combine into a single mount for two cameras simple means for adjustment of the distance between the two cameras to mimic the distance between human eyes.

Another object of the invention is to combine into a single mount for two cameras simple means for adjustment of the image (nodal) point around which two cameras are rotated for convergence.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 6 shows simplified, conceptual, top down view of the dual camera mount demonstrating the precision convergence mechanism.

DETAILED DESCRIPTION OF THE INVENTION

Referring more specifically to the drawings, for illustrative purposes the invention is embodied in the apparatus generally shown in FIG. 1 through FIG. 6. It will be appreciated that the apparatus may vary as to configuration and as to details of the parts, and that the method may vary as to details and the order of the steps, without departing from the basic concepts as disclosed herein.

A. Convergence Adjustment

Figure 1:
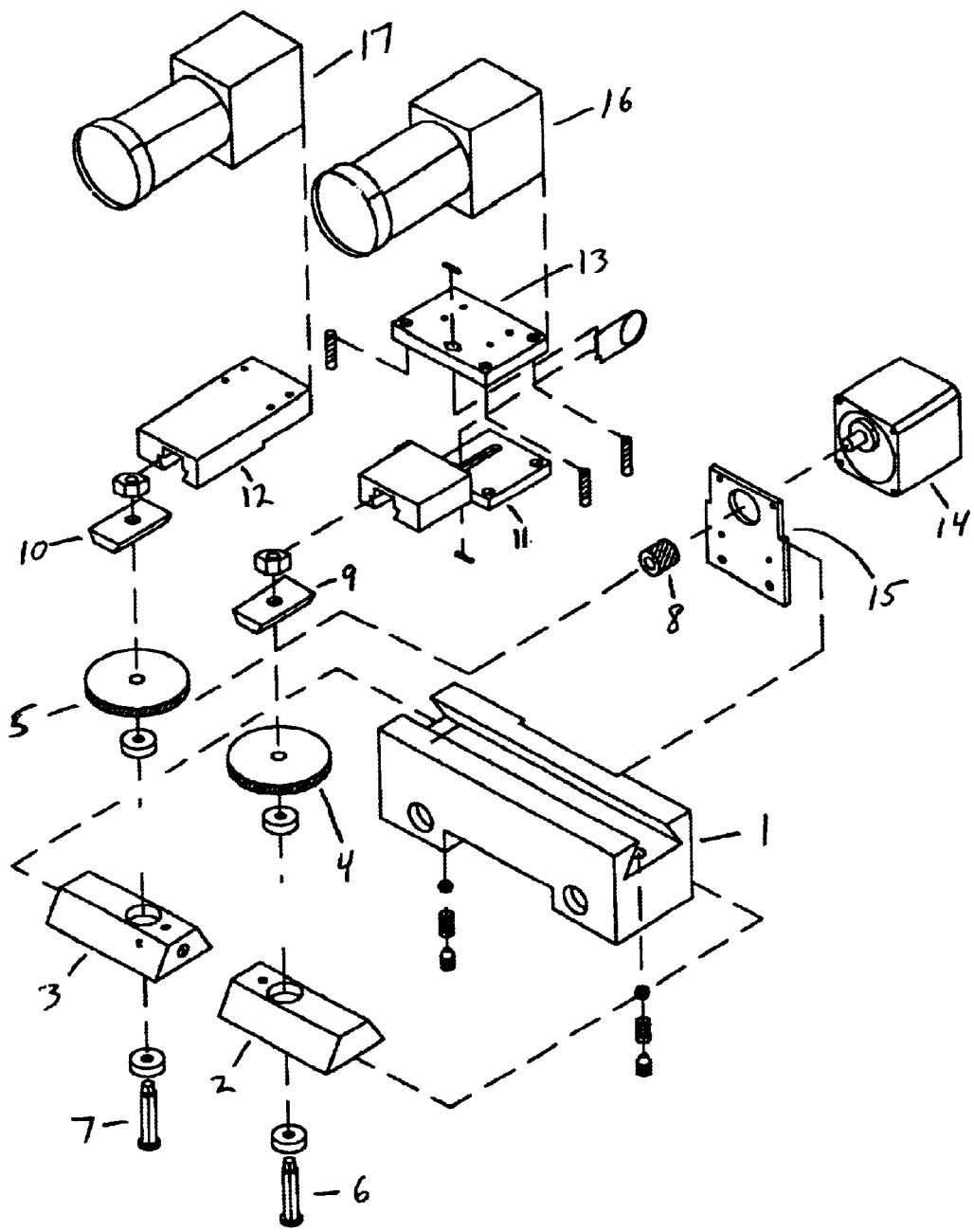
FIG. 1 shows an exploded, isometric view of a complete, two camera mount with integral worm gear convergence control with electric motor drive, precision image focal plane adjustment mechanism, and two example cameras.

Referring to FIG. 1, the dual camera convergence assembly is comprised of the base mounting plate 1, gear mount dovetail slides 2 and 3, worm gears 4 and 5, worm gear bearing assemblies 6 and 7, worm 8, camera mount dovetail slides 9 and 10, adjustable camera mounting bracket 11, fixed camera mounting bracket 12, image plane adjustment plate 13, and associated hardware as shown. Also shown is an electric motor 14 to rotate the worm, a motor mounting bracket 15 to hold the electric motor, and two example cameras 16 and 17.

Figure 2:
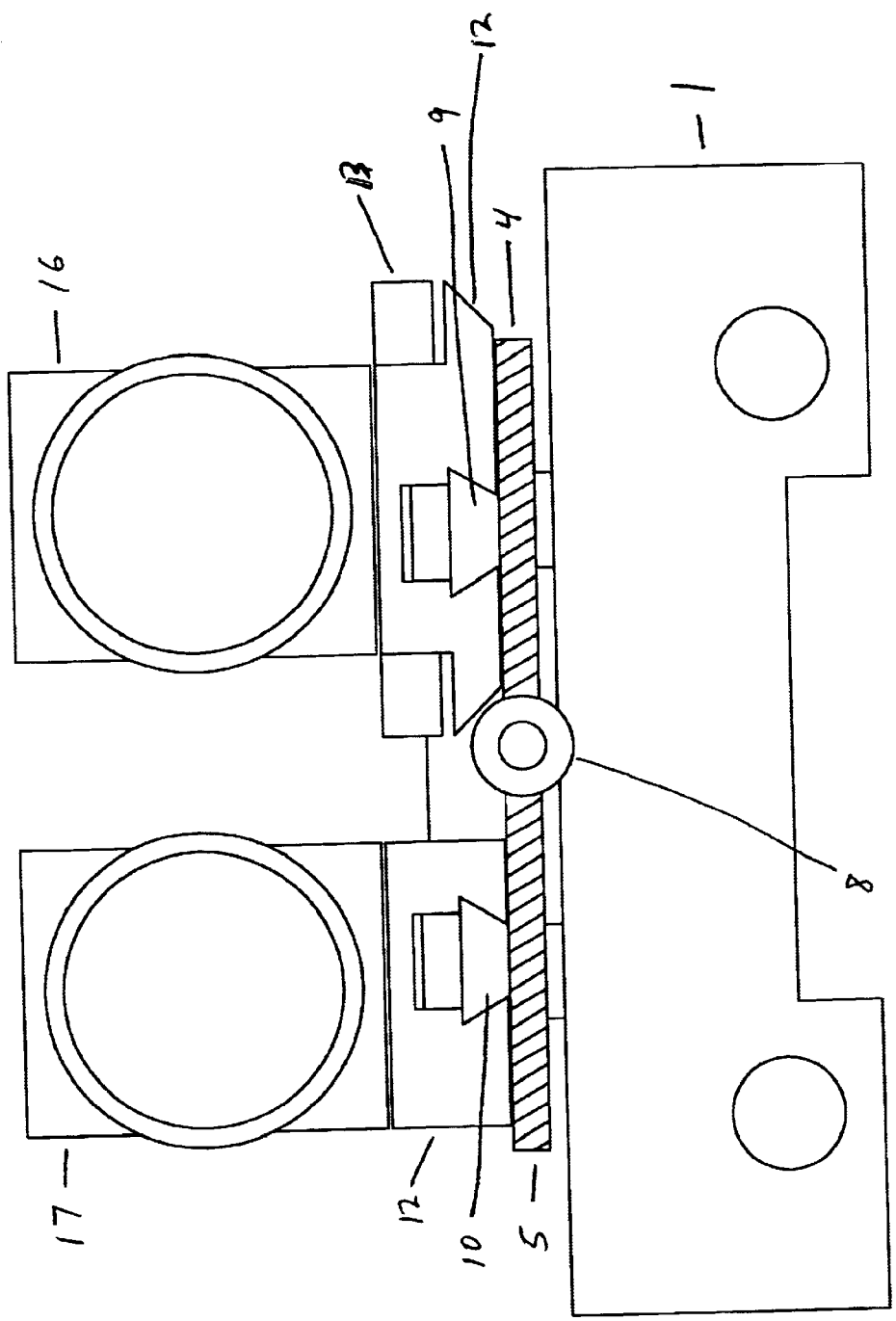
FIG. 2 shows a front view of a complete, two camera mount with integral worm gear convergence control with electric motor drive, precision image focal plane adjustment mechanism, and two example cameras.
Figure 3:
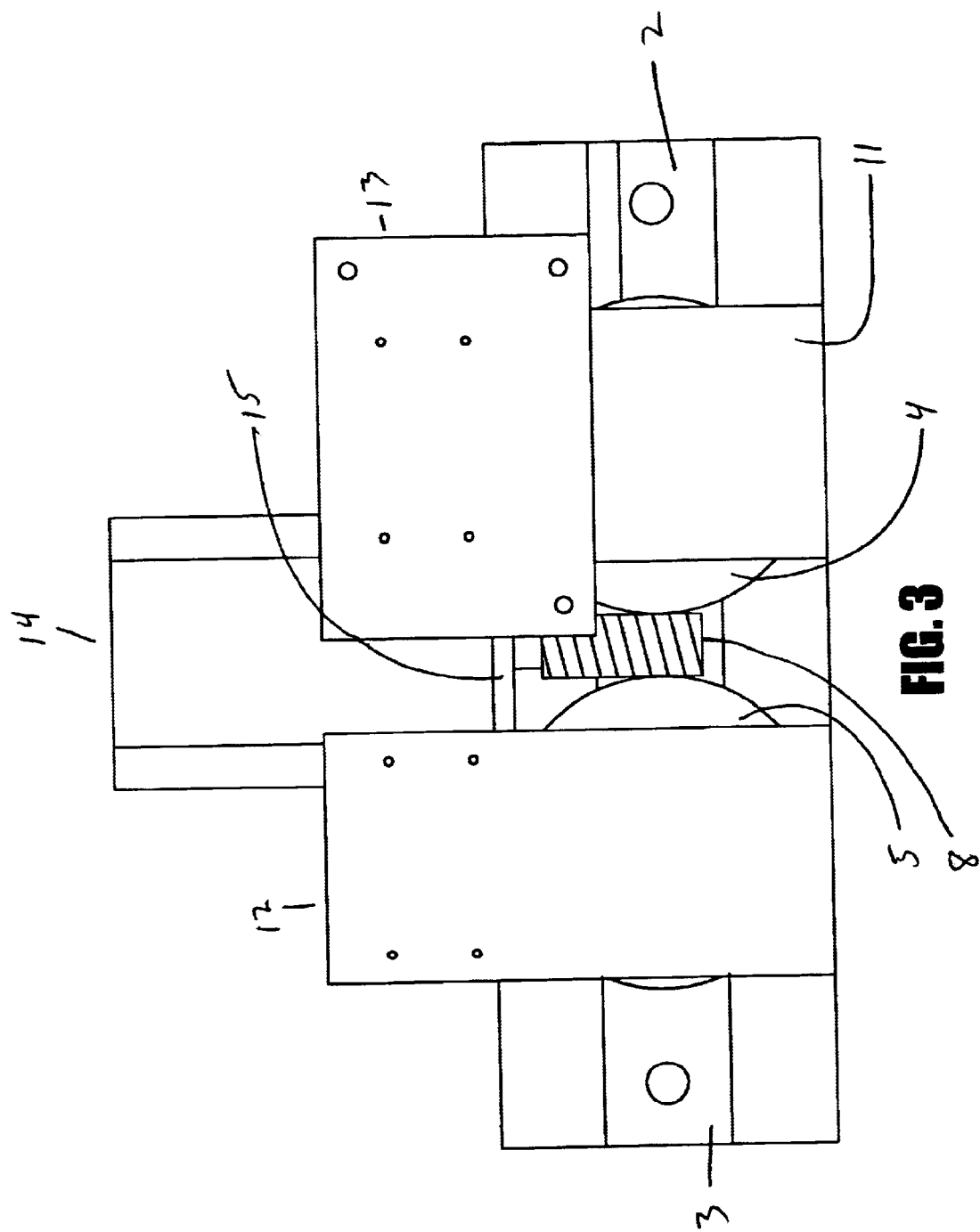
FIG. 3 shows a top view of a complete, two camera mount with integral worm gear convergence control with electric motor drive, precision image focal plane adjustment mechanism, and two example cameras.
Figure 4:
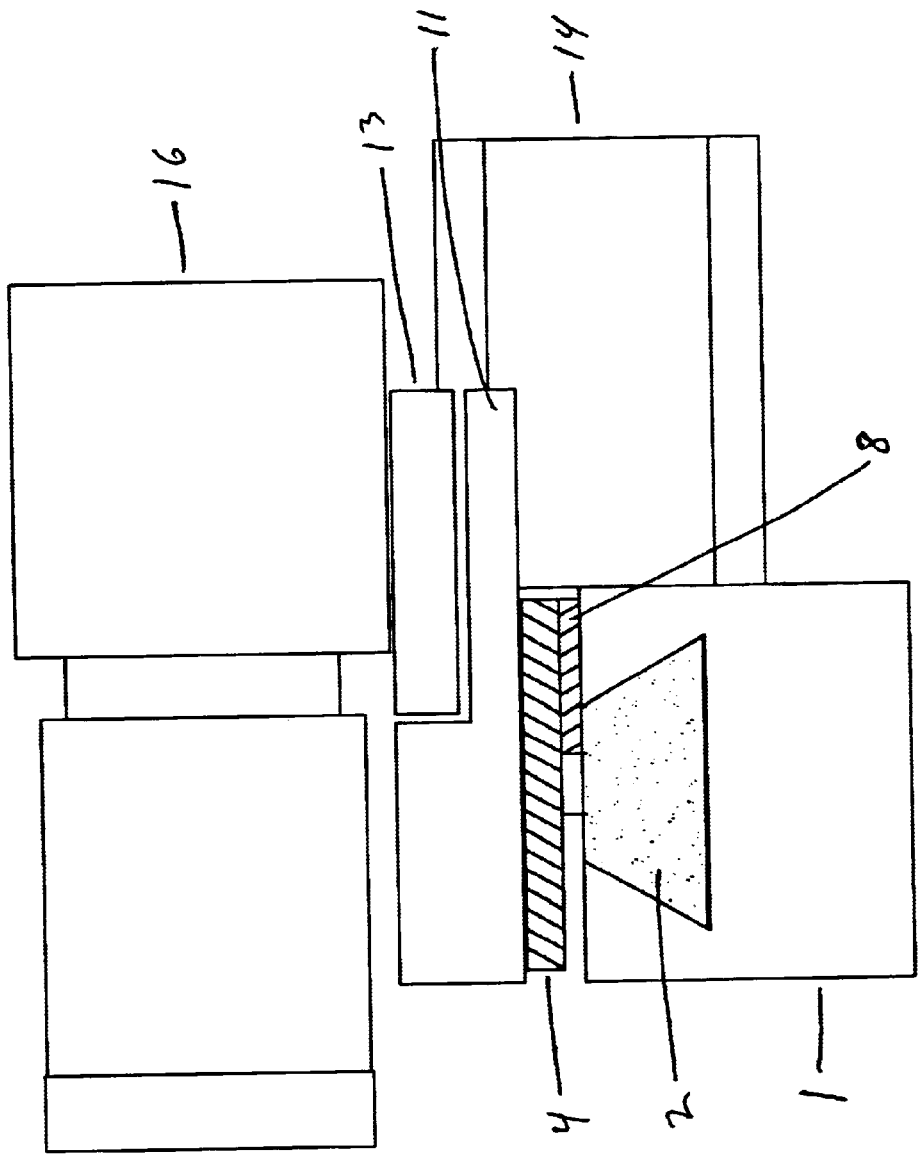
FIG. 4 shows a side view of a complete, two camera mount with integral worm gear convergence control with electric motor drive, precision image focal plane adjustment mechanism, and two example cameras.

FIGS. 2 through 4 show, respectively, a front view, top view, and side view of the subject dual camera mount in an unexploded format. These figures are present to assist in the three dimensional interpretation of the FIG. 1 exploded isometric view of applicant's invention.

The convergence assembly is designed to permit precision, synchronous rotation of cameras 16 and 17, which are positioned on the same optical plane, such that the line of sight of the optical systems of cameras 16 and 17 converge at the same distance from the image focal planes of cameras 16 and 17. The convergence of the two cameras 16 and 17 is controlled by the simultaneous and synchronous rotation of the two worm gears 4 and 5 by means of the rotation of worm 8, thereby adjusting the optical line of sight of cameras 16 and 17 to a single point of convergence at a desired distance. For example, referring to FIG. 6, rotating worm 8 in one direction rotates the worm gears 4 and 5 synchronously, thereby simultaneously rotating cameras 16 and 17 so that the line of sight of each camera converges (crosses the centerline) at 10 feet from the subject two camera mount. Referring again to FIG. 6, rotating worm 8 in the other direction results in the convergence of cameras 16 and 17 at 20 feet from the subject camera mount. By similar movement of worm 8, the convergence of the two cameras can be adjusted from a few inches to infinity.

FIGS. 1 and 6 and the foregoing discussion describe a preferred embodiment of a precision convergence adjustment mechanism between two cameras. Other mechanical components and varying mechanical configurations could be substituted for some of the specific mechanical components shown in applicant's drawings. For example, worm gears 4 and 5, along with worm 8, could be replaced by spur type gears, direct drive discs, or even pulley drives. However, the principle of operation of the convergence adjustment mechanism would remain the same: the image focal planes (i.e., the optical line of sight) of cameras 16 and 17 are pointed at the same object at a given distance from the camera mount, such pointing being done by means of synchronized rotating devices to which the cameras 16 and 17 are affixed, and such synchronized rotating devices being simultaneously driven by a third, single rotating device that is manually or automatically turned in the desired direction.

B. Image Focal Plane Adjustment

Figure 5:
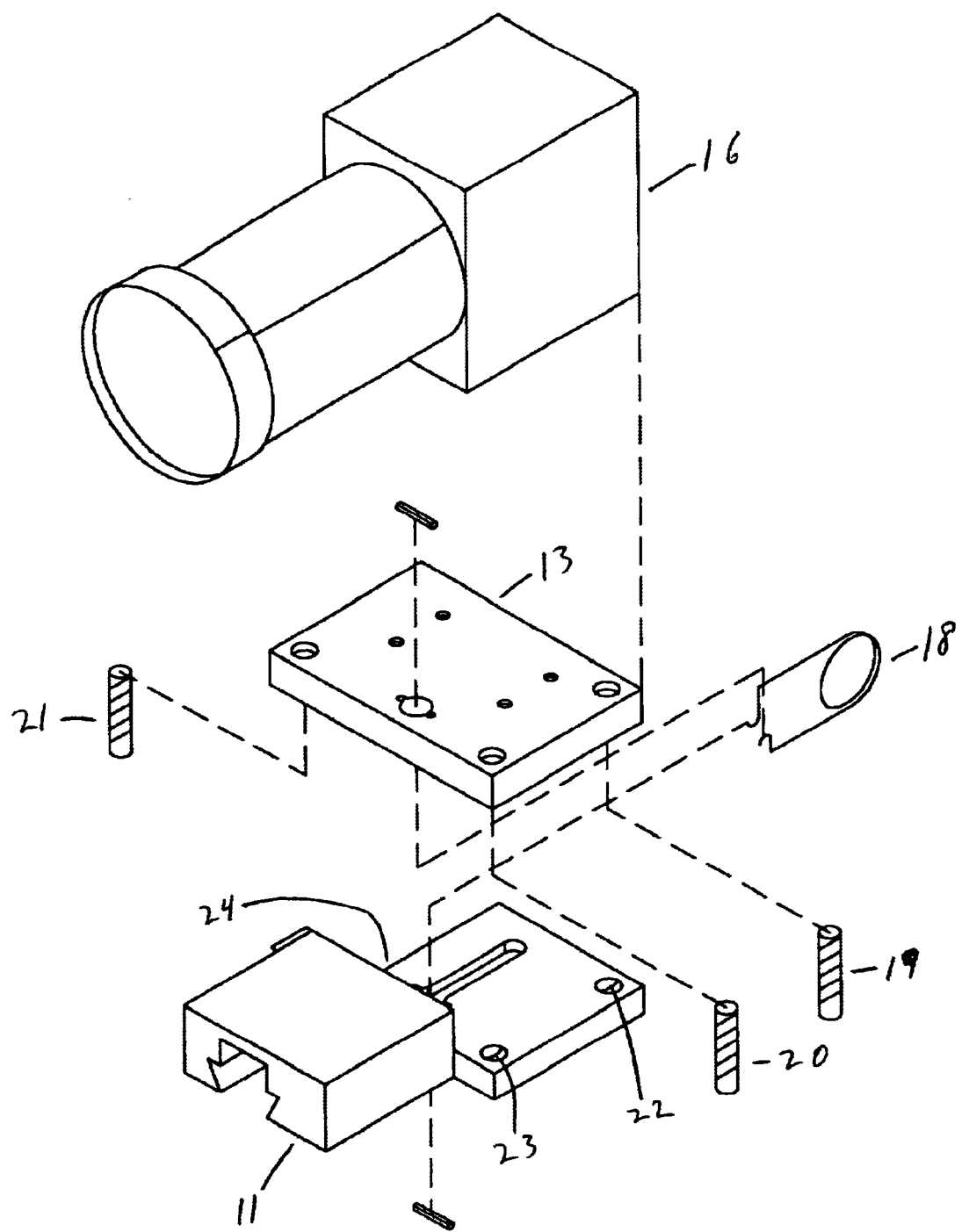
FIG. 5 shows an explosive close up isometric view of the precision image focal plane adjustment mechanism in the dual camera mount, and an example camera.

FIG. 5 shows a closeup of the precision image focal plane adjustment mechanism which is comprised of camera mounting bracket 11, image focal plane adjustment plate 13, example camera 16, spring 18, ball nose screws 19, 20, 21, and spherical depressions 22, 23, and 24. Camera mounting bracket 11 and image focal plane adjustment plate 13 are held together by the tension of spring 18, but kept some distance apart by the ball nose screws 19, 20, and 21.

Referring to FIG. 6, the purpose of the image focal plane adjustment mechanism is to enable the precision alignment of the image focal planes 25 and 26 in example cameras 16 and 17 such that the two image focal planes 25 and 26 are at the same height, are at the same pitch angle, and are at the same roll angle with respect to base mounting plate 1.

The three ball nose screws 19, 20, and 21 intersect the effective plane of image focal plane adjustment plate 13 such that the effective plane of image focal plane adjustment plate 13 can be moved (as a plane) in pitch, roll and altitude. The yaw of image focal plane adjustment plate 13 is fixed.

The seating of the ball nose screws 19, 20, and 21 in respective spherical depressions 22, 23, and 24 fixes yaw and prevents undesired lateral movement. By adjusting the length of ball nose screw 19 relative to ball nose screws 20 and 21, the pitch of image focal plane adjustment plate 13 is altered. By adjusting the length of ball nose screw 21 relative to ball nose screws 19 and 20, the roll of image focal plane adjustment plate 13 is altered. By adjusting the length of all three ball nose screws at the same time, the height of the image focal plane adjustment plate 13 is altered.

The movement of image focal plane adjustment plate 13 (as a plane) in pitch, roll and altitude enable the image plane of example camera 16 to be aligned to the image plane of example camera 17, which is in a fixed position by its fixed attachment to camera mounting bracket 12.

FIGS. 1 and 5 and the foregoing discussion show a preferred embodiment of a precision image plane adjustment mechanism between two cameras. Other mechanical components and varying mechanical configurations could be substituted for some of the specific mechanical components shown in applicant's figures. For example, torsion### spring 18 could be replaced by a leaf type spring and adjustment screws 19–21 could be of a different type. However, the principle of operation of the image plane adjustment mechanism would remain the same: three tangent### points define a plane against which the camera bracket 13 can be moved in pitch, roll and altitude so as to enable the image plane of camera 16 to be aligned to the image plane of camera 17, which has a fixed position.

C. Distance Between Camera Adjustment

Referring to FIG. 1, the base mounting plate 1, and gear mount dovetail slides 2 and 3 are designed with a "dovetail" slide design that permits the adjustment of the distance between the center of rotation of each worm gear 4 and 5, and accordingly, the center to center distance between the adjustable camera mounting bracket 11 and fixed camera mounting bracket 12, and thereby, the effective center to center distance of the example cameras 16 and 17. The average distance between human eyes is approximately 2.5 inches, and Applicant's preferred embodiment uses worm gears 4 and 5 with a diameter such that, when meshed with worm 8, the center to center distance is very close to 2.5 inches. If for some reason the center to center distance between the example cameras 16 and 17 needed to be changed, then the diameter of the worm gears 4 and 5 would be increased or decreased, thereby enabling a change in the center to center distance.

D. Location of Camera Nodal Point Adjustment

Referring to FIG. 1, camera mount dovetail slides 9 and 10 provide the ability to individually move adjustable camera mounting bracket 11 and fixed camera mounting bracket 12 forwards and backwards. Referring to FIGS. 1 and 6, this possible motion permits the image "nodal" points 27 and 28 to be individually adjusted with respect to the center of rotation of worm gears 4 and 5, thereby enabling the image "nodal" points 27 and 28 for respective example cameras 16 and 17 to be adjusted to the same position being the optical line of sight.

E. Summary

The present invention can be varied in many details of the mechanical design so as to accommodate different cameras, lens assemblies, electric motors (or manual drive) for the worm rotation, as well as to permit operation within specific environments, physical space requirements, and attachment of the subject two camera mount to different tripods, gibbs, and other types of camera supports.

Although the description above contains many specificities, these should not be construed as limiting the scope of the invention, but merely as providing illustrations of the presently preferred embodiments of this invention.

What is claimed is:

1. An apparatus for mounting two cameras for stereo graphic imaging with the capability to control the convergence of said two cameras, the capability to adjust the position of the image focal plane in one of said cameras with respect to the image focal plane in the other said camera, such that the two said cameras are correctly focused on the same image, the capability to adjust the spacing between the two cameras such as to mimic the average distance between human eyes, and the capability to adjust the two cameras such that the two cameras, while being converged, rotate around the same image (nodal) point, comprising:

(a) two gears, friction discs, or pulleys with a feature on the top surface for mounting a camera (collectively "gear"), each said gear mounted on a separate shaft and bearing assembly, the rotation of each said gear synchronized to the rotation of the other said gear, said gears able to rotate in either direction; and (b) a gear, friction disc, or pulley mounted on a separate shaft and bearing assembly capable of simultaneously driving the synchronized rotation of the said gears ("gear driver"); and (c) means for rotating said gear driver to cause the synchronized rotation of said gears in either direction, thereby enabling the convergence of said cameras to be adjusted; and (d) a non-adjustable mounting for one of said cameras affixed to one of the said gears such that when one of said cameras is attached to said non-adjustable mounting, said camera remains in a fixed position with respect to said gear, and (e) an adjustable mounting for the other said camera affixed to the other said gear comprised of two brackets held together by three adjustable screws and a spring located centrally among, said adjustable screws, said adjustable screws applying force opposite to said spring such as to keep said two brackets separated, but permitting the pitch, roll and distance between said two brackets to be adjusted by changing the relative length of said adjustable screws to each other; and (f) means for turning said adjustable screws in said adjustable mounting such as to alter the pitch, roll and distance between said two brackets, thereby enabling the image focal plane of said camera mounted to said adjustable mounting to be aligned with the image focal plane of the other said camera mounted on the other said non-adjustable mounting; and (g) two adjustable dovetail slides onto which said gears are mounted such as to permit the adjustment of the distance between the center of rotation of each said gear, thereby enabling the effective center to center distance between said cameras to be increased or decreased; and (h) means for moving said adjustable dovetail slides onto which said gears are mounted as to permit the effective center to center distance between said cameras to be increased or decreased; and (i) two adjustable dovetail slides mounted on top of said gears such as to permit the adjustment of the forward or backward position (along the optical line of sight) of each said camera, thereby enabling the image (nodal) point of each said camera to be individually adjusted along its respective optical line of sight; and (j) means for moving said adjustable dovetail slides on top of which said gears are mounted as to permit the adjustment of the forward or backward position (along the optical line of sight) of each said camera, thereby enabling the image "nodal" point of each said camera to be individually adjusted along its respective optical line of sight.

2. A method of using an apparatus for mounting two cameras for stereo graphic imaging with the capability to control the convergence of said two cameras, adjust the position of the image focal plane on one of said cameras relative to the image focal plane in the other said camera, adjust the spacing between the two said cameras to mimic the average distance between human eyes, and adjust the two said cameras such that the two said cameras, while being converged, rotate around the same image (nodal) point, comprising the steps of:

(a) controlling the convergence of said two cameras by providing:

(i) two gears, function discs, or pulleys with a feature on the top surface for mounting a camera (collectively "gear"), each said gear mounted on a separate shaft and bearing assembly, the rotation of each said gear synchronized to the rotation of the other said gear, said gears able to rotate in either direction; and (ii) a gear, rotation disc, or pulley mounted on a separated shaft and bearing assembly capable of simultaneously driving the synchronized rotation of said gears ("gear driver"); and (iii) a means for rotating said gear driver to cause the synchronized rotation of said gears in either direction, thereby enabling the convergence of said cameras to be adjusted; and (b) adjusting the position of the image focal plane of one of said cameras relative to the image focal plane in the other said camera by providing:

(i) a non-adjustable mounting for one of said cameras, said non-adjustable mounting affixed to said gear such that when one of said cameras is attached to said non-adjustable mounting, said camera remains in a fixed position with respect to said gear; and (ii) an adjustable mounting for the other said camera affixed to the other said gear comprised of two brackets held together at three points by adjustable screws, pins, rods or ties (collectively "screws") with a spring located in the middle of said adjustable screws applying force opposite to said adjustable screws such as to keep said two brackets separated, but permitting the pitch, roll and distance between said two brackets to be adjusted by turning said adjustable screws; and (iii) a means for adjusting said adjustable screws in said adjustable mounting such as to alter the pitch, roll and distance between said two brackets, thereby enabling the image focal plane of said camera mounted to said adjustable mounting to be aligned with the image focal plane of the other said camera mounted on the other said non-adjusting mounting; and (c) the capability to adjust the spacing between the two said cameras such as to mimic the average distance between human eyes by providing:
   (i) two adjustable dovetail slides onto which said gears are mounted such as to permit the adjustment of the distance between the center of rotation of each said gear, thereby enabling the effective center to center distance between said cameras to be increased or decreased; and (d) the capability to adjust the two said cameras such that the two said cameras, while being converged, rotate around the same image (nodal) point by providing:
   (i) two adjustable dovetail slides mounted on top of said gears, such as to permit the adjustment of the forward or backward position (along the optical line of sight) of each said camera, thereby enabling the image (nodal) point of each said camera to be individually adjusted along its respective optical line of sight.

* * * * *